FIG. I.

March 6, 1951 E. M. CROSLAND 2,544,527
MACHINERY FOR CUTTING OUT PIECES OF PLASTIC
MATERIAL FROM A CONTINUOUSLY MOVING SHEET
Filed Feb. 13, 1948 4 Sheets-Sheet 4

Inventor,
Edward Milner Crosland
By
S. Victor Armstrong
Attorney

Patented Mar. 6, 1951

2,544,527

UNITED STATES PATENT OFFICE 2,544,527

MACHINERY FOR CUTTING OUT PIECES OF PLASTIC MATERIAL FROM A CONTINUOUSLY MOVING SHEET

Edward Milner Crosland, Culcheth, near Warrington, England, assignor to T. & T. Vicars Limited, Earlestown, Newton-le-Willows, England Application February 13, 1948, Serial No. 8,230
In Great Britain February 13, 1946

3 Claims. (Cl. 107—20)

1

This invention relates to machinery for cutting out pieces of plastic material from a continuously moving sheet wherein a set of cutters carried by a reciprocating platen acts on a sheet of plastic material supported by a table.

It will be appreciated that if the sheet is moving continuously in a horizontal plane, then the cutters and the table must be moving substantially in synchronism with the sheet during the time the cutters are engaging the material; therefore the action of cutting will be by cutters having a combined vertical and horizontal reciprocation, the table having a horizontal reciprocation only.

One object of this invention is to provide a simplified actuating arrangement for effecting appropriate movements of the cutters and table respectively.

According to the present invention a machine for cutting out pieces from a continuously moving sheet or web of material has a cutting head which is reciprocated in two directions at right angles so that the cutters describe a closed path in space, the reciprocation in a direction parallel to movement of the web being effected by a lever of the first order, the pivot of which is adjustable to adjust the length of horizontal travel.

Figure 1:
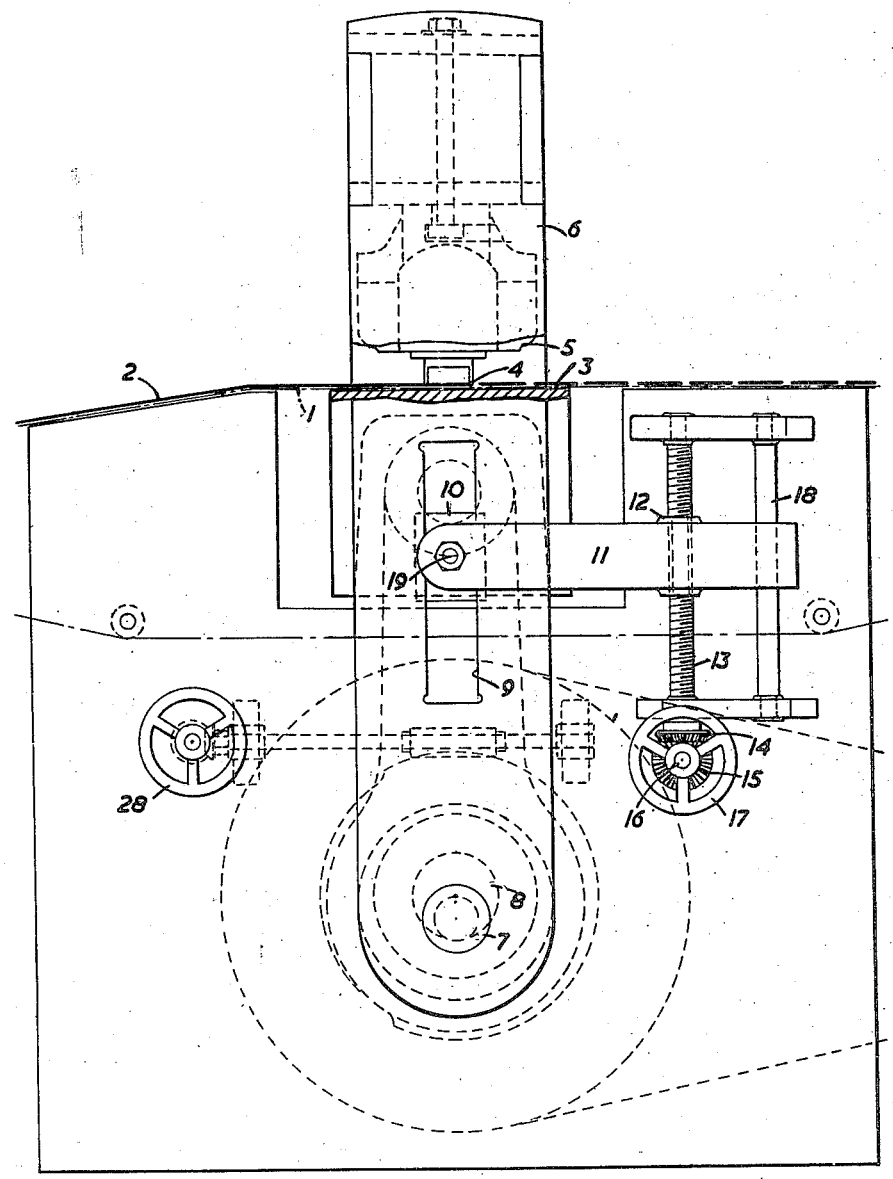
Figure 2:
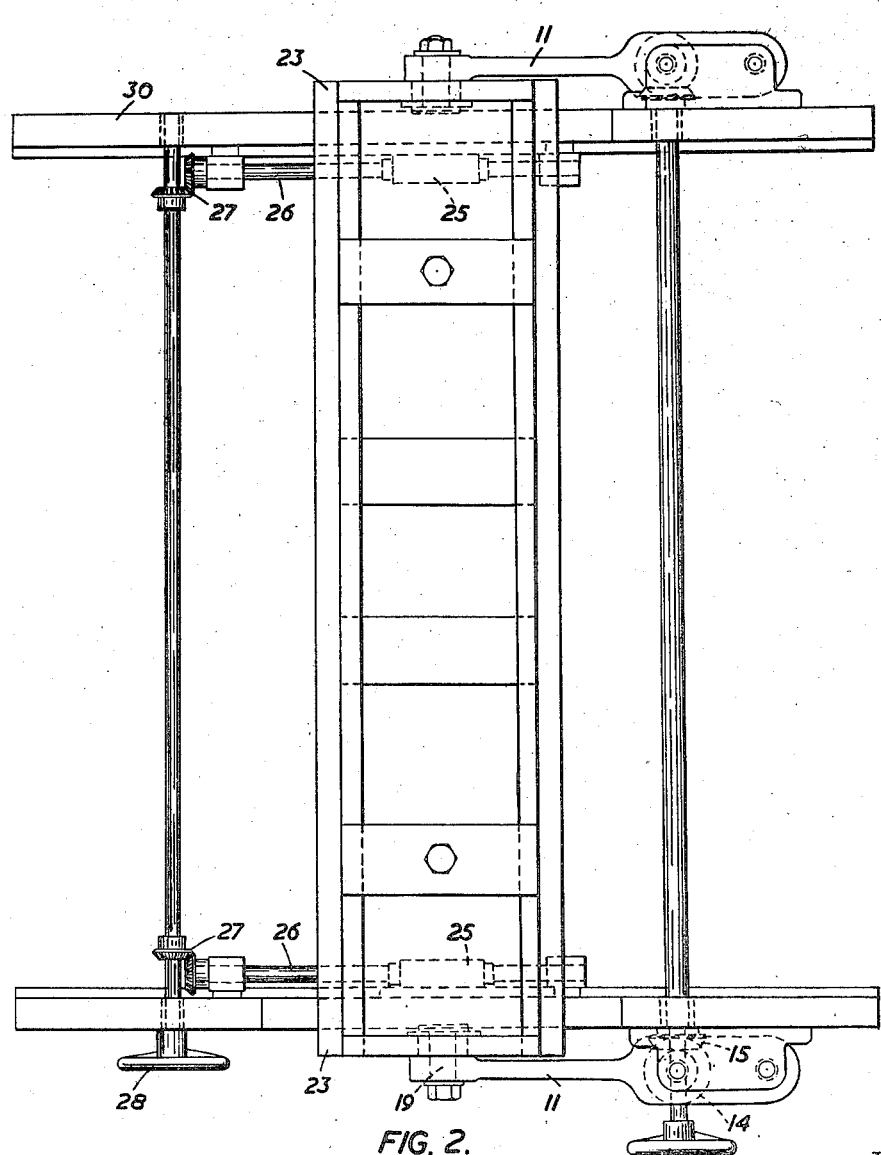
Figure 3:
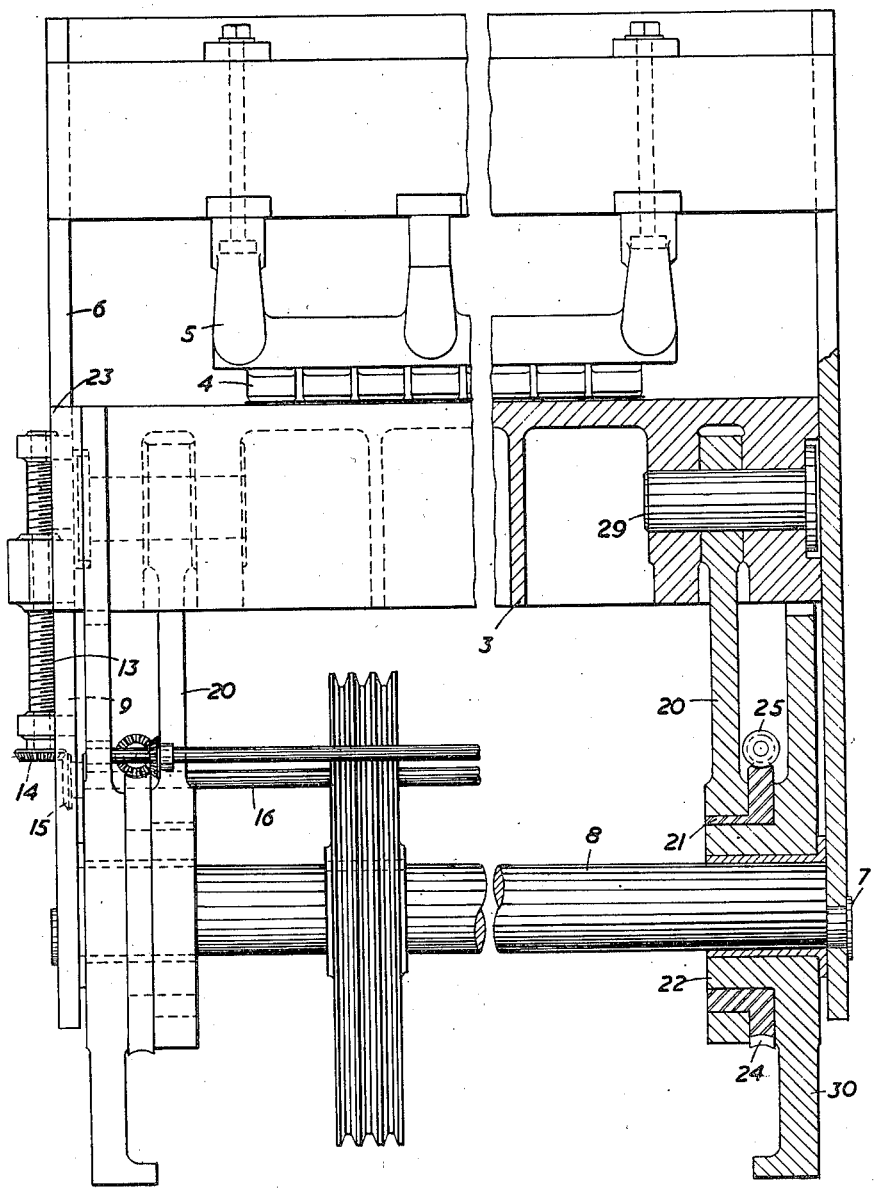
Figure 4:
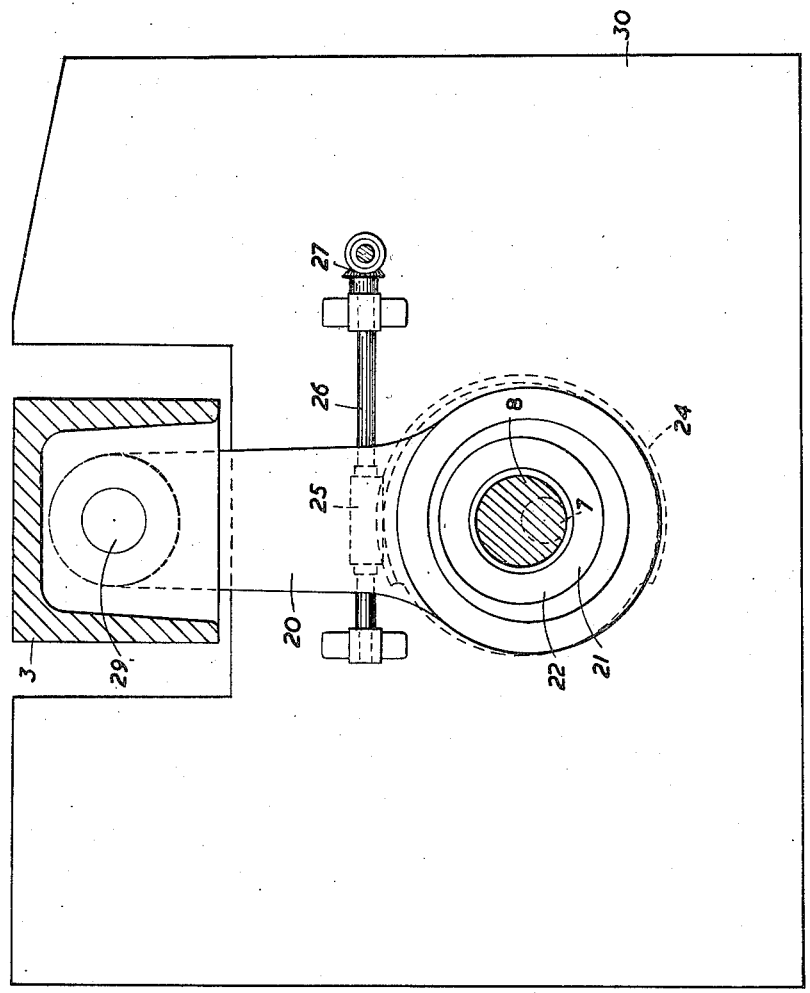

The invention is further described with reference to the accompanying drawings, in which:

Fig. 1 is a diagrammatic longitudinal elevation of a cutting head and mechanism for its reciprocation, Fig. 2 is a corresponding plan view, Fig. 3 is a corresponding end view, Fig. 4 is a side elevation of the table supporting means.

A continuous band conveyor 1 carrying either sheets or, more usually, a continuous web 2 of plastic material such as dough for the manufacture of biscuits, passes over a table 3 on which it is temporarily supported whilst the biscuits are cut out from the dough web by means of cutters 4 mounted in a cutter block 5 supported on a pair of connecting rods 6, the lower ends of which are pivoted to rotating crank pins 7 on a rotating shaft 8.

These connecting rods 6 intermediate their length are slotted as shown at 9 to form guides for blocks 10 carried upon arms 11 which are provided with threaded bushes 12 receiving threaded shafts 13 having upon them bevel wheels 14 in engagement with bevel wheels 15 on a cross shaft 16 provided with an operating wheel 17. It will consequently be seen that by rotating the hand wheel 17 the shafts 13 will be turned about their

2 own axes to displace vertically either up or down the arms 11, which are guided upon bars 18, and thus to vary the position of the blocks 10 pivoted at 19 to the ends of these arms 11.

This adjustment allows the length of the horizontal component of movement of the cutters to be altered in order to keep the same or substantially the same width of scrap between cut out biscuits irrespective of the size of the cutter cutting out the biscuit blanks.

It will also be seen that the levers 6 act as levers of the first order, and the cutters 4 are displaced in space through a closed path the vertical component of which is set by the throw of the crank pins 7, whilst the horizontal component is set by the adjustments of the pivotal centre 19 relatively to the axis of the shaft 8 by the aforesaid operation of the hand wheel 17. It will consequently be seen that if the sheet of material 2 on the conveyor web 1 is travelling from left to right, then the crank pins 7 will be moving clockwise during the cutting stroke, and that the cutters will move with the material during the cutting operation, so obtaining a clean cut.

As the sheet of material is comparatively thin, the actual period in which the cutters are in contact with the dough will normally be well within 90° of the complete cycle. Suitable adjustment by the hand wheel 17 is provided so that table movement will correspond with the conveyor speed during the period in which the cutters are in contact with the dough, so that this cutting operation takes place without disturbing in any way, the dough sheet carried by the conveyor.

The amount of horizontal movement of the table 3 and of the cutters 4 in the same direction and plane as the web will be approximately one-third of the total amount of movement of the web during one complete cycle.

The connecting rods 6 are mounted in guides formed by extensions 23 of the table 3, so that this table above the pivot 19 will be moved to and fro in synchronism with the cutters.

The table 3 has to take considerable pressure during the cutting operation and is supported upon crank arms 20, the lower ends of which are bored to receive an eccentric bush 21 rotatably mounted about a boss 22 on the frame 30. Each bush 21 has a worm segment 24 integrally secured thereto. Worm 25 on one end of a pair of cross shafts 26 mounted in bearings in the frame engage the worm segments 24, and the other end of the cross shafts have a bevel wheel drive 27 from an adjustment hand wheel 28. Thus by operation of the hand wheel the height of the table 3 may be adjusted as desired.

I declare that what I claim is:

1. A machine for cutting out pieces from a continuously moving web of plastic material, including in combination a frame, cutters, a conveyor moving continuously in one direction, a lever for reciprocating said cutters in directions parallel to the movement of the web and at a right angle to the plane thereof so that said cutters describe a closed path in space, a pivot for said lever, a bar carrying said pivot, guides on the frame, and means to displace the bar in said guides to adjust the position of said pivot relatively to said lever for varying the length of travel of said cutters parallel to the movement of the web.

2. A machine for cutting out pieces from a web of plastic material supported by a continuously moving conveyor, including in combination: a machine frame, a connecting rod, a cutter head fixedly mounted at one end of the connecting rod and disposed above the conveyor, a pin and slot connection between the connecting rod and a fixed part of the machine frame, means to both reciprocate the connecting rod and to oscillate the connecting rod about the pin of said pin and slot connection, and means to adjust the position of the pin and slot connection relative to said fixed part of the machine frame.

3. A machine for cutting out pieces from a continuously moving web of plastic material consisting in combination of a conveyor moving continuously in one direction, a connecting rod, means for engaging material on said conveyor disposed at one end of said connecting rod, a rotary shaft, a crank pin on said shaft engaging a perforation in the opposite end of said connecting rod to that supporting the means engaging the plastic material on the conveyor, a pivoted block, the pivot thereof displaceable in a longitudinal slot intermediate the length of said connecting rod, a machine frame carrying said conveyor and said rotary shaft, and means to adjust the pivot of said block relatively to said connecting rod.

EDWARD MILNER CROSLAND.

REFERENCES CITED

The following references are of record in the file of this patent:

UNITED STATES PATENTS

| Number | Name | Date |
| --- | --- | --- |
| 1,172,520 | Green | Feb. 22, 1916 |
| 2,043,684 | Walter | June 9, 1936 |